March 5, 1968  L. D. JOHNSON  3,371,364

TOOL HOLDER

Filed Oct. 11, 1965

INVENTOR
Lloyd D. Johnson

BY De Lio and Montgomery
ATTORNEYS

United States Patent Office 3,371,364
Patented Mar. 5, 1968

3,371,364
TOOL HOLDER
Lloyd D. Johnson, Portland, Conn., assignor to Telco Corporation, Hartford, Conn., a corporation of Connecticut
Filed Oct. 11, 1965, Ser. No. 494,650
4 Claims. (Cl. 10—129)

ABSTRACT OF THE DISCLOSURE

This invention relates to a tapping or threading tool holder for use on a turret lathe or other machine tool, having a rotating head or chuck by which the workpiece may be rotated in either direction. In particular, this invention is directed to a tool holder comprising in combination a housing, a spindle mounted in said housing for rotation therein, a chuck for holding a tool, at least a portion of said chuck mounted in said spindle for movement therewith, means formed in said housing and co-acting with means cooperating with said spindle for permitting the spindle to move in a direction parallel to its axis and to selectively rotate within said housing depending upon the position of the spindle in the housing, a longitudinal slot defined in a portion of said spindle, a shaft supported by said housing, and a pawl slidably mounted on said shaft, said pawl having a portion thereof positioned to engage said longitudinal slot and said pawl constructed such that the spindle may rotate in a first direction and be prevented from rotating in a direction opposite to the first direction.

---

This invention relates to a tool holder and more particularly to a tapping or threading tool holder for use on a turret lathe or other machine tool having a rotating head or chuck by which the workpiece may be rotated in either direction.

In machines of this type it is desirable that the tool and its supporting member be held stationary until such time as the cutting tool has reached the extent of its travel, at which time the cutting tool is then released so that no further cutting of the workpiece will take place. With tools of this type, it is highly desirable that the chuck for mounting the tool be so mounted that misalignment of a workpiece is minimized. Additionally, it is often highly desirable that the operator be provided with an indication that the threading tool has reached its extent of travel so that he may stop the machine.

In view of the foregoing, it is an object of this invention to provide a new and improved tool holder.

Another object of the invention is to provide a new and improved tool holder including means for permitting a tool holding chuck to be resiliently held during rotation thereof.

Another object of this invention is to provide a new and improved tool holder including means for indicating to an operator that the tool has reached the extent of its travel.

A further object of this invention is to provide a new and improved tapping or threading attachment which includes a stationary housing in which an internal tool holding spindle is permitted to move in a longitudinal direction, so that a threading tool threads and proceeds into the rotating workpiece at the correct angle lead and position.

Still further objects and advantages of this invention will in part be obvious and will in part be apparent from the specification.

The invention accordingly comprises the features of construction, combinations of elements and arrangements of parts which will be exemplified in the constructions hereinafter set forth and the scope of the invention will be indicated in the claims.

For a fuller understanding of the invention, reference is had to the following description taken in connection with the accompanying drawing, in which.

Figure 1:
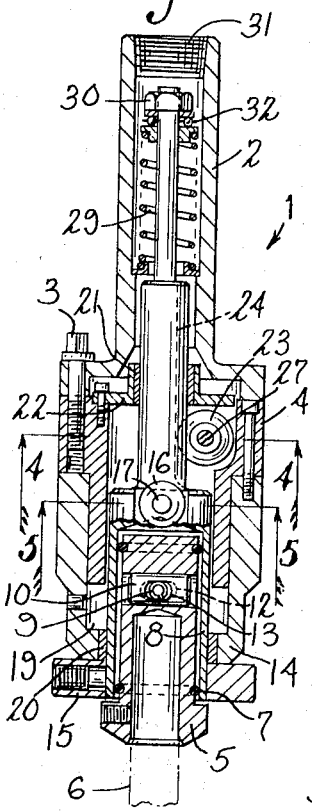
FIG. 1 is a longitudinal sectional view of a tool holder according to the invention.
Figure 2:
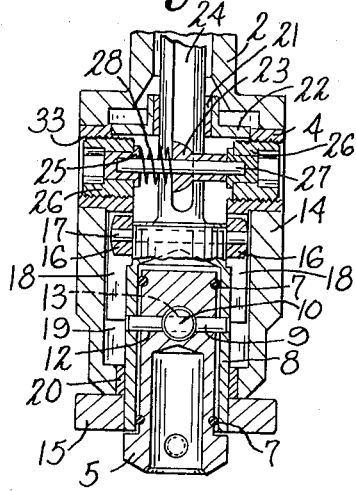
FIG. 2 is a fragmentary longitudinal sectional view of the tool holder taken at right angles to FIG. 1.

Referring to FIGS. 1–5, the tool holder 1 is fixedly and securely mounted by means of the mounting shank 2, in a stationary holder such as the tool holding the turret of a turret lathe (not shown) or similar machine. Four collar screws 3 are provided to fasten the mounting shank 2 to the stationary housing 4 to permit positioning of a floating chuck 5 accurately in relation to the workpiece in a machine chuck. When the correct position has been achieved, the collar screws 3 are tightened to secure the shank 2 to the housing 4 and thus maintain the positional adjustment. The floating self-centering chuck 5 grips a tap or threading tool 6 in the usual and well known manner. The chuck 5 is suspended inside the spindle 8 on O-rings 7 (such as neoprene) which, due to their natural resilience, will permit the chuck 5 to deflect in either an angular or radial direction in relation to the longitudinal axis of the holder when the tap or threading tool 6 is deflected by an external force such as that caused by hole or stud misalignment in the workpiece. When the external forces affecting tool 6 are removed, the natural resilience of the O-rings 7 will return the chuck 5 to the central position.

Figure 3:
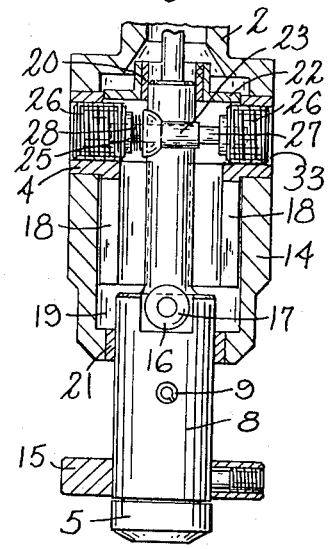
FIG. 3 is a fragmentary longitudinal sectional view also taken at right angles to FIG. 1, showing a spindle in a released position.
Figure 4:
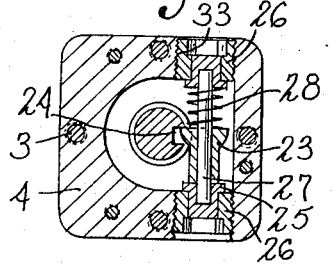
FIG. 4 is a sectional view taken along line 4—4 of FIG. 1.

The chuck 5 is attached to the spindle 8 by a self-locking pin 9 which connects and drives the spindle 8 through a cross-pin 10. The cross-pin 10 is permitted to slide in a bore 11 and a clearance slot 12 is provided in chuck 5 for the self-locking pin 9, thus allowing radial float of the chuck 5 parallel to the axes of the cross-pin 10 and self-locking pin 9. A clearance hole 13 is provided in the cross pin 10 to permit movement on the self-locking pin 9. The chuck 5 is also allowed to pivot on the cross-pin 10 and self-locking pin 9, thus permitting angular deflection with a mechanical action similar to that of a universal joint. The spindle 8 containing the floating chuck 5 is constructed to move longitudinally in the stationary housings shown at 4 and 14 while rotationally static, as well be further described, and be released or rotate with the workpiece at the extreme end of its movement, as illustrated in FIG. 3. It is apparent from the drawing that the release point is always in the same place, that is, with the spindle 8 fully extended out of the housing 4.

The total longitudinal movement of spindle 8 is adjustable by altering the starting position. A releasable collar 15, which bears against housing 14, may be repositioned by the operator to control the total movement of spindle 8 and thus the length of thread cut by the tool 6. The collar 15 also serves as a knob or handle by which the spindle 8 may be extended manually, thus-engaging the threading tool 6 with the workpiece. The method of operation mentioned above is especially desirable when the attachment is used with small taps or dies to thread soft materials where operator feel or technique is important for acceptable threads.

The spindle is provided with rollers 16 which are attached to it by means of a pin 17 on which rollers 16 are permitted to rotate. The rollers 16 are contained in two longitudinal slots 18 which are integral with housing 4 and completely enclosed in housing 14. These rollers 16 prevent the spindle 8 from rotating with the workpiece until it has reached the extreme end of its stroke, FIG. 3, and releases. The spindle 8 is actually pulled into the release position by the cutting action or lead of the thread being cut. When the spindle 8 is moved longitudinally, the rollers 16 roll in the slots 18, thereby reducing the friction and the force needed to move it. The reduction of force required for spindle 8 movement serves to minimize the possibility of distortion of the thread form being cut by the tool 6, since the force required to move it originates from the lead of the thread being cut as the threading tool 6 screws itself into the workpiece.

As the spindle 8 nears the extreme end of its stroke, as shown in FIG. 3, the rollers 16 roll out of the slots 18, thus permitting spindle 8 rotation with the workpiece and eliminating further longitudinal movement of the threading tool 6. The action described above its the "released condition" of the attachment. When spindle 8 is released the rollers 16 also rotate radially with the spindle in a bore 19 provided in housing 14 for this purpose.

A roller pawl 23 is positioned on a shaft 27, on which it is allowed to slide longitudinally and rotate. When the spindle 8 is in a "released condition," the roller pawl 23 will be forced to move longitudinally against a compression spring 28 by the rotation of a slot 24 in the spindle 8. The roller pawl 23 will be held against the compression spring 28 for the duration of the rotation in the released direction, emitting an audible click for each revolution as the slot 24 trips the roller pawl 23, thus providing the operator with additional notification of the "released condition."

The spindle 8 is contained radially on two oil-impregnated porous bronze bearings 20, 21 which surround the spindle 8 and are secured in stationary housing 4 and a flange 22. These bearings permit the spindle 8 to rotate and move longitudinally while maintaining the correct radial position.

When the operator reverses the direction of rotation of the machine chuck and thus the workpiece rotation, the threading tool 6 will drive the spindle 8 through the chuck 5 for a portion of a revolution (not more than 180°). This partial revolution of the spindle 8 in the reverse direction will cause the roller pawl 23 to engage in slot 24. The roller pawl 23 will be forced to bear against the solid stop 25, preventing further reverse rotation of the spindle 8 and threading tool 6. When the roller pawl 23 is against the stop 25, the rollers 16 are automatically and precisely positioned to enter the slots 18 without any preceptible binding or interference.

Stop adjustment screws 26 are provided to adjust the position of the roller pawl 23 for smooth roller 16 action. This is accomplished by loosening one adjustment screw 26 and tightening the other until rollers 16 are precisely positoned to enter slots 18 as indicated by operating the spindle 8 manually. This adjustment feature also enables the operator to compensate for normal wear of either the stop 25, the slot 24, or the roller pawl 23, or a combination of all three. Another object of this feature is to provide a method of converting the attachment from right hand to left hand threading, or vice versa, without removal from the machine to which it has been attached. This is accomplished by removing one of the adjustment screws 26 completely from housing 4 to expose the roller pawl 23 assembly. The roller pawl 23, the shaft 27, the spring 28 and adjustable stops 25 are an integral assembly and may be removed as one unit through hole 33. Reversal of threading is realized by turning the pawl assembly end for end and reinserting it back into the housing 4 through the hole 33, locking it in place with the adjustment screw 26, and adjusting the screws 26 for a smooth roller 16 action, as previously described.

The mode of threading for which the attachment is set is indicated externally by the markings on the ends of stops 25 which are visible through the adjustment screws 26 and the markings on one side of the housing 4. With the workpiece rotating in the reverse direction, the threading tool 6 will be held stationary by the action of the roller pawl 23, as previously described, and the lead of the threading tool will start to return the spindle 8 to the preset starting point. The roller pawl 23 bearing against stop 25, will roll in the slot 24 and engage the rollers 16 in the slots 18, as previously described. The rollers 16 will prevent the spindle 8 from rotating and the threading tool 6 will screw itself out of the rotating workpiece. When the threading tool 6 has screwed itself completely out of the workpiece, a spindle spring 29, enclosed in the mounting shank 2, will return the spindle 8 to its preset starting position. The spindle spring 29 is under light compression and when the spindle 8 is in a released condition the spring 29 is compressed to the maximum extent. The purpose of the spring 29 is to maintain the spindle 8 in the starting position during rapid indexing cycles of a tool holding turret, preventing accidental feed out of the spindle 8 due to centrifugal force, and to prevent the threading tool 6 from burnishing the last thread upon leaving the workpiece. Another purpose of the spring 29 is to counterbalance the complete spindle assembly and threading tool 6 in the event the attachment is used in a vertical position, chuck 5 down. A self-locking adjustment nut 30 is provided to increase or decrease the compression of the spring 29 to compensate for various weights of threading tools 6 indexing speeds and operational positions of the attachment.

An end plug 31, screwed into the end of the mounting shank 2, must be removed for access to the adjustment nut 30. A ball thrust bearing 32 is provided to allow the spring 29 to remain rotationally static while the spindle 8 rotates in the "released condition."

Figure 5:
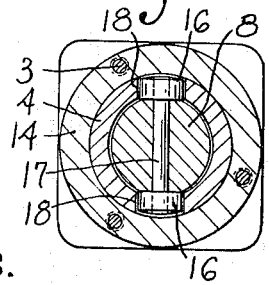
FIG. 5 is a sectional view taken along line 5—5 of FIG. 1.
Figure 6:
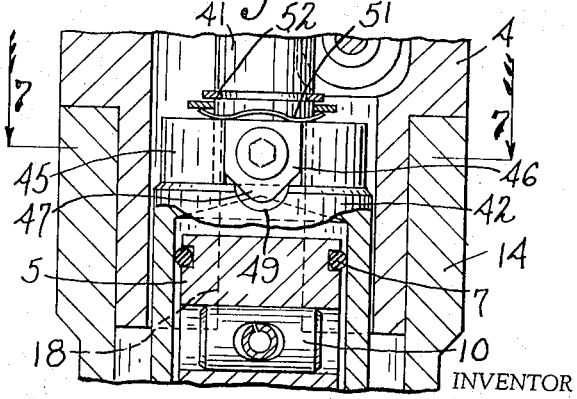
FIG. 6 is a longitudinal sectional view of a portion of a tool holder according to an alternate embodiment of the invention.
Figure 7:
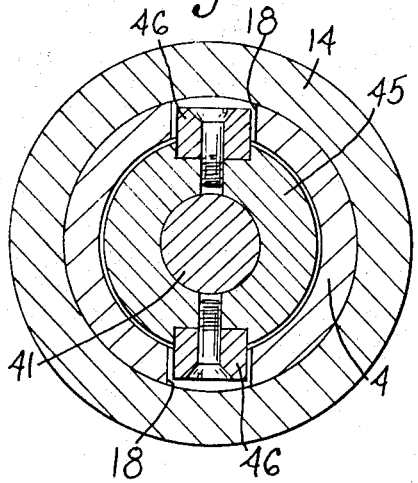
FIG. 7 is a sectional view taken along line 7—7 of FIG. 6.

Referring now to FIGS. 6 and 7, there is shown an alternate embodiment of the release shown more particularly in FIG. 5. In the alternate embodiment, a spindle is constructed such that there is a smaller diameter portion 41 and a larger diameter portion 42. Positioned on the shoulder of portion 42 is a collar 45 to which is coupled a pair of lugs 46 having tip portions 47. The tip portions are positioned such that they mate with cut-out portions 49 in the spindle portion 42. In order to maintain the tip portions 47 in the cut-out portions, a spring mechanism 51 is provided which is held in position by a split ring 52 coupled to spindle portion 41. The spindle will remain stationary due to the mating of the cut-out portions 49 and the tip portions 47 until the spindle is drawn downwardly to a point where the lugs 46 are permitted to rotate.

The spring mechanism may be selected such that it will permit the spindle to rotate in a slipping movement if an extraordinary force is applied to the spindle, the force being greater than a force normally encountered during use of the tool.

It will thus be seen that the objects set forth above, among those made apparent from the preceding description, are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statement

What is claimed is:

1. A tool holder comprising in combination a housing, a spindle mounted in said housing for rotation therein, a chuck for holding a tool, at least a portion of said chuck mounted in said spindle for movement therewith, means formed in said housing and co-acting with means cooperating with said spindle for permitting the spindle to move in a direction parallel to its axis and to selectively rotate within said housing depending upon the position of the spindle in the housing, a longitudinal slot defined in a portion of said spindle, a shaft supported by said housing, a pawl slidably mounted on said shaft, said pawl having a portion thereof positioned to engage said longitudinal slot, said pawl constructed such that the spindle may rotate in a first direction and be prevented from rotating in a direction opposite to the first direction, said chuck having a bore, a first pin slidably mounted in said bore, said first pin and chuck including clearance slots, and a second pin supported by said spindle at its ends, said second pin passing through said clearance slots to couple said chuck to said spindle.

2. A tool holder in accordance with claim 1, including a plurality of resilient rings suspending said chuck from said spindle.

3. A tool holder comprising in combination a housing, a spindle mounted in said housing for rotation therein, a chuck for holding a tool, at least a portion of said chuck mounted in said spindle for movement therewith, means formed in said housing and co-acting with means cooperating with said spindle for permitting the spindle to move in a direction parallel to its axis and to selectively rotate within said housing depending upon the position of the spindle in the housing, a longitudinal slot defined in a portion of said spindle, a shaft supported by said housing and a pawl slidably mounted on said shaft, said pawl having a portion thereof positioned to engage said longitudinal slot and said pawl constructed such that the spindle may rotate in a first direction and be prevented from rotating in a direction opposite to the first direction, said housing including a plurality of longitudinal slots defined in the interior thereof, a bore defined in the interior of said housing into which said longitudinal slots extend, a plurality of rollers coupled to said spindle and selectively mounted for movement in said slots and said bore depending on the position of the spindle in the housing, and said pawl and said spindle slots being positioned with respect to each other and said longitudinal slots such that the rollers are aligned for movement from said bore into said slots.

4. An attachment comprising a radially positionable mounting shank to be secured to a static tool holder of a machine tool capable of rotating a workpiece in either direction, said attachment having a stationary housing with an integral spindle surrounded by and enclosed therein, said spindle being free to move longitudinally in the housing while maintained rotationally static and being releasable at the extreme end of its stroke to permit rotation in a singular preset direction, said spindle having a releasable collar which is positionable to control the total longitudinal movement of the spindle, said spindle containing within itself a floating self-centering chuck and means for mounting the chuck, said chuck adapted to hold a thread cutting tool and move longitudinally and rotationally with the spindle, said spindle to be guided by bearings and prevented from rotating by rollers when moving in a longitudinal direction, said rollers mounted on and moving with the spindle are contained in slots provided in the stationary housing, said rollers entering into a housing bore at the extreme end of the longitudinal movement to release the spindle and permit rotation in one direction, said rotation to be controlled by a preset rotary pawl enclosed in the static housing and said rollers and spindle to be prevented from rotating in the reverse direction by this rotary pawl and aided in the retraction of the spindle into the housing by said pawl and an attached spindle spring.

References Cited

UNITED STATES PATENTS 2,881,454   4/1959   Moneymaker _____ 10—89
2,858,553   11/1958  Bearhalter _____ 10—129

FRANCIS S. HUSAR, *Primary Examiner.*